United States Patent
Keen et al.

[15] 3,641,983
[45] Feb. 15, 1972

[54] ANTIBLISTER CAGE MAT AND METHOD FOR RAISING BROILERS

[72] Inventors: Everett M. Keen; Anthony J. Siciliano, both of Vineland, N.J.

[73] Assignee: Diamond International Corporation, New York, N.Y.

[22] Filed: Apr. 14, 1970

[21] Appl. No.: 28,390

[52] U.S. Cl. .................................................119/17, 119/19
[51] Int. Cl. ..................................................A01k 31/00
[58] Field of Search ..............119/17, 18, 19, 21, 22, 45; 229/6, 31

[56] References Cited

UNITED STATES PATENTS

| | | | |
|---|---|---|---|
| 2,026,417 | 12/1935 | Conway et al. | 119/19 |
| 2,753,841 | 7/1956 | Hawkins | 119/21 |
| 2,856,897 | 10/1958 | Galinsky et al. | 119/22 |
| 3,326,186 | 6/1967 | Doll | 119/19 |

FOREIGN PATENTS OR APPLICATIONS

| | | |
|---|---|---|
| 1,081,293 | 4/1959 | France |

*Primary Examiner*—Hugh R. Chamblee
*Attorney*—Karl W. Flocks

[57] ABSTRACT

An antiblister mat, particularly adapted for raising broilers in a cage having a mesh floor on which broilers normally cannot be raised blister-free, in which the broilers are installed and breast or keel bone blisters are minimized, in which the mat is substantially resilient and comprises a plurality of openings so dimensioned and arranged as to prevent the breast of the broiler, when sitting, from engaging the mesh floor of the cage, and in which the mat comprises various arcuate or tubular cross sections and in which the mat and cage are readily cleaned and sterilized, and permit manure and the like to drop or pushed by birds' feet through the cage floor.

9 Claims, 6 Drawing Figures

INVENTORS
EVERETT M. KEEN
ANTHONY J. SICILIANO

BY

Karl W. Flocks
ATTORNEY 3,641,983

ANTIBLISTER CAGE MAT AND METHOD FOR RAISING BROILERS

BACKGROUND OF THE INVENTION

1. Field of the Invention

This application relates generally to animal husbandry, and more particularly to the raising of poultry in cages, and concerns the raising of broilers to approximately the age of about 8 weeks (ready for market) in cages.

2. Description of the Prior Art

Cages for broiler raising have been heretofore proposed, some of which included a woven wire floor having a ½-inch mesh, ½ by 1 inch mesh and/or 1 inch by 1 inch plastic-coated woven wire has also been proposed. The particular problem involved concerns the unusual tendency of both "susceptible" and "resistant" strains of broilers to develop blisters on their keel or breast bones and skin, requiring excessive trimming away of blisters and a considerable reduction of salable meat. As presently advised, the exact reason for the development of breast blisters has not been ascertained. Broilers have been raised for market under controlled conditions using strains of broilers "resistant" and "susceptible" to brest blisters, the cage floors have been washed daily to eliminate manure and the like, and both tube feeders and feed troughs as well as nipple waterers were used, and yet blisters have developed to an undesirable degree. Additionally, the number of broilers per square feet of cage space was controlled.

The major conclusion of the prior art has been that growing broilers in cages to prepare them ready for market is extremely difficult and has been considerably hampered by the development of keel bone blisters on the broilers.

SUMMARY OF THE INVENTION

Applicants have concluded that when raising broilers through the marketing age of about 8 weeks when they are at a satisfactory marketing weight, the cage floor surface must provide a comfortable resting place where due to crowded conditions the birds tend to eat, drink, sleep or rest while lying down on the cage floor. It is, of course, necessary to substantially immediately eliminate manure droppings and it is important that the cage floor be kept particularly clean, not only to prevent blisters, but also to eliminate the possibility of other disease transmittal that could reek havoc in a relatively confined poultry house which might include as many as 12,000 coops in which the broilers are being "produced."

Applicants have found that an antiblister mat, preferably produced as a three-dimensional element, can be incorporated in conventional cages and conform generally to the external dimensions of the cage floor. This three-dimensional antiblister mat will incorporate a plurality of openings of sufficient dimension to permit manure to drop readily therethrough, and the mat will be of such a character as to lay flat and/or bend and permit it to be readily washed and maintained in a substantially clean and essentially sterile condition.

Further, the dimensions of the openings in the antiblister mat will be such that even when the broiler is sitting, the keel or breast bone would be maintained above the generally wire floor of the cage when the broiler is from about 2 to 3 weeks old, and to a major extent the openings will be such as to essentially provide a nest for the broilers when sitting or resting.

More particularly, the antiblister mat comprises a regular pattern of transverse openings and will overlie in a generally flat relationship the mesh or open cage floor in which the broilers are to be raised; the openings being bordered on at least two sides by three-dimensional and preferably arcuate cross-sectioned elements, connected by intermediate straps and/or three-dimensional elements arranged in a rectangular pattern in which the bordering elements have an arcuate cross section which is semicircular, elliptical, etc., as well as the provision of closed tubular bordering elements forming the through openings.

These, together with other and more specific objects and advantages will become apparent from a consideration of the following description when taken in conjunction with the drawing forming a part hereof, in which:

DESCRIPTION OF THE PREFERRED EMBODIMENTS

Figure 1:
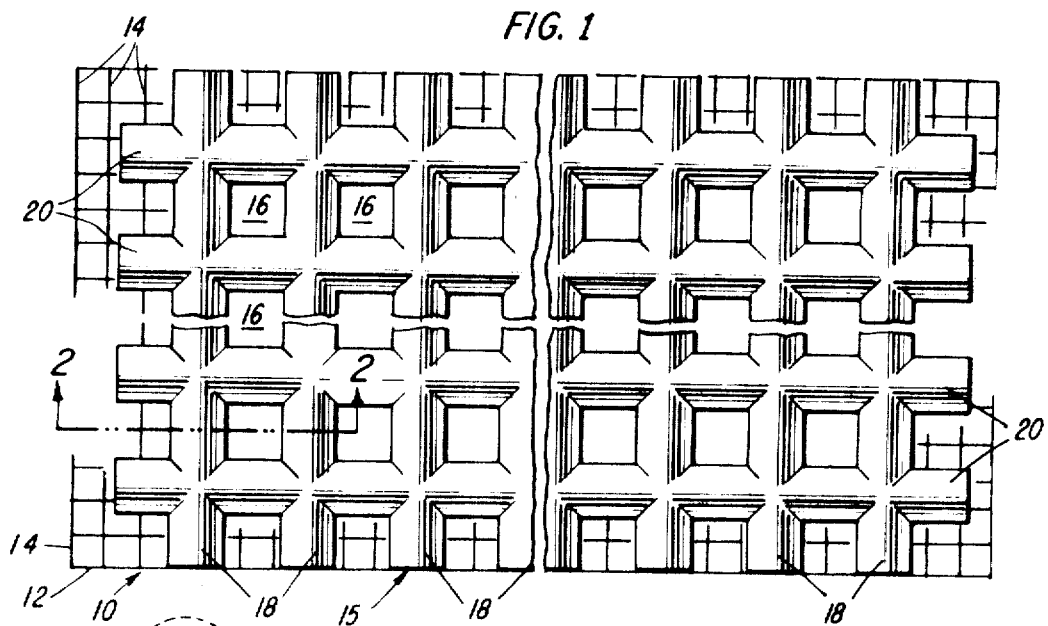
FIG. 1 is a plan view of a cage floor with the antiblister mat of the invention disposed thereon; an intermediate portion of the mat and floor being broken away.

Referring to the drawing in detail, and first considering FIG. 1, the bottom of the cage is indicated generally at 10 and comprises a plurality of suitably woven or interengaged, intersecting wires 12 and 14 which will be on ½-inch centers to form ½-inch square openings.

Removably overlying the bottom of the cage 10 is an antiblister mat indicated generally at 15 and produced from a suitable molded plastic such as polyethylene or the like.

Figure 2:
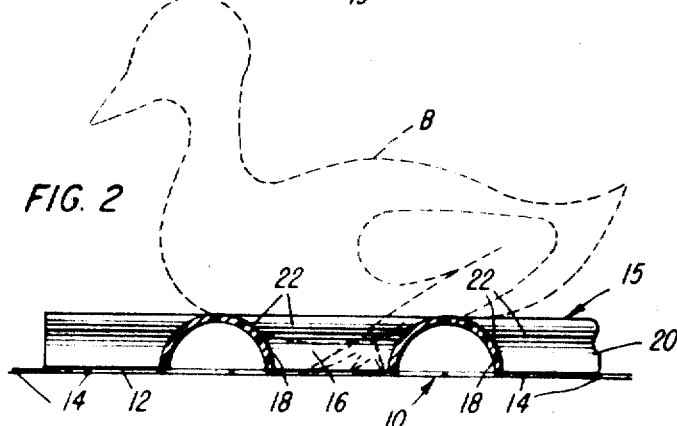
FIG. 2 is an enlarged section taken on the plane of line 2—2, FIG. 1, showing in phantom lines a broiler seated in one of the through openings forming a "nest" or support for the broiler.

The antiblister mat incorporates a uniform pattern of transverse openings 16 which are preferably at least three-fourths inch along their narrowest dimension, and in FIG. 1 are illustrated as being three fourths inch square. The openings 16 are bordered on at least two sides by raised mutually parallel hollow elements, and in the preferred embodiment, comprising four of such elements disposed in mutual pairs to form square openings. The tubular elements extend longitudinally and transversely and are identified at 18 and 20, respectively, and the terminal ends are squared off with the overall dimensions of the mat substantially confirming to the dimensions and outline of the wire bottom 10. As seen in FIG. 2, the elements 18 and 20 have a semicircular cross section and define at the upper edge of the openings 16, a radiused upper peripheral margin 22 which normally directs debris and manure, for example, to the screen bottom therebelow, and the openings 16 together with the upwardly diverging and radiused margin 22 define a nesting area for the broiler B. The broilers should be installed in the cages as soon as possible and raised therein until they attain marketing weight; the birds before being fattened are relatively gawky, having long legs and a small body. The opening or nest formed by the portions 16 and 22 provide a highly desirable nesting and resting area for the bird being fattened to market.

The mat 14, preferably being produced from molded plastics, is readily washed and/or sterilized and can assume various cross-sectional shapes.

Figure 3:
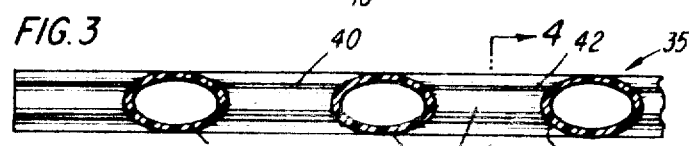
FIG. 3 is a sectional view, similar to FIG. 2, and showing another embodiment of the antiblister mat.
Figure 4:
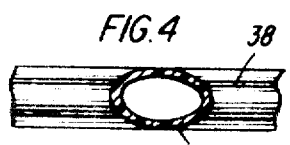
FIG. 4 is a vertical section taken substantially on the plane of line 4—4 of FIG. 3.

Referring to FIG. 3, another embodiment of antiblister mat is indicated generally at 35 and comprises longitudinal and transverse elements 38 and 40, these elements being arranged according to the same general proportions of the mat 14 and as illustrated in FIG. 2. Elements 38 and 40 in this embodiment comprise closed tubular elements having an elliptical cross section; however, these elements can also be circular in cross section (not shown). The elements 38 and 40 combine to define a regular pattern of rectangular openings 36 bordered at both their upper and lower edges by an outwardly diverging radiused periphery 42 and 42', respectively.

Figure 5:
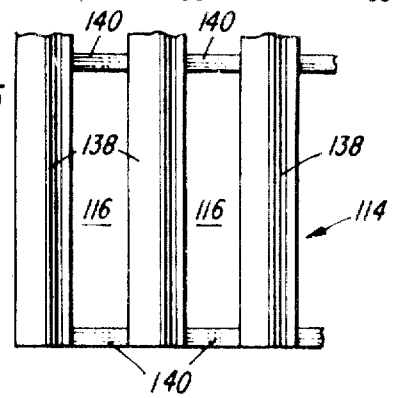
FIG. 5 is a plan view of another embodiment of the antiblister mat.
Figure 6:
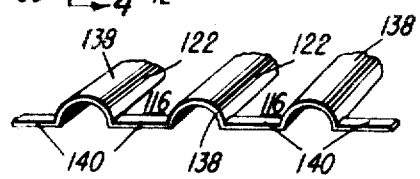
FIG. 6 is a fragmentary end elevation of the floor mat of FIG. 5.

Referring to FIG. 5, a still further embodiment of the mat is indicated generally at 114, and comprises a plurality of generally mutually parallel, semicircular cross-sectioned elements 138, forming therebetween openings 116, and the elements 138 are connected by transverse, flat straps 140 which are generally in the plane of the lower edge of elements 138. The elements 138, as seen in FIG. 6, have a semicircular cross section and define therebetween downwardly converging sides 122, of an elongated nesting area 116 which also conveniently permits the broiler B to nest thereon without engaging the wire bottom 10.

It will be obvious to those skilled in the art that various changes may be made without departing from the scope of the invention and the invention is not to be considered limited to what is shown in the drawings and described in the specification.

What is claimed is:

1. An antiblister cage mat arrangement for cage-raising broilers and deterring the development of blisters on the keel or breast bone skin or meat of the broilers, comprising in combination with an open mesh cage floor, mat means comprising a body including an outer dimension substantially conforming to and overlying the mesh floor of the cage,
    said mat means including a generally planar lower surface and a repetitive series of through openings, said openings being defined on at least two sides by marginal, tubular, resilient elements.

2. The structure as claimed in claim 1 in which the openings are at least three-fourths inch along one dimension for preventing the breast bone of a normal 4-week-old broiler from engaging the mesh floor beneath the mat means.

3. An antiblister cage mat arrangement for cage-raising broilers and deterring the development of blisters on the keel or breast bone skin or meat of the broilers, comprising in combination with an open mesh cage floor, mat means comprising a body including an outer dimension substantially conforming to and overlying the mesh floor of the cage, said mat means including a generally planar lower surface and a repetitive series of through openings, said openings being defined on at least two sides by marginal resilient elements which are at least partially tubular.

4. The structure as claimed in claim 3 in which said series of repetitive openings are rectangular and are bordered on all sides by three-dimensional elements having an arcuate cross section.

5. The structure as claimed in claim 4 in which said bordering elements define a rectangular opening and are semicircular in cross section.

6. The structure as claimed in claim 4 in which said bordering elements are tubular.

7. The structure as claimed in claim 6, in which said bordering elements are elliptical in cross section.

8. The structure as claimed in claim 3, in which said openings are elongated and rectangular in plan, defined by said resilient elements which are in the form of two side ribs extending in substantially mutually parallel relation, the ribs being three-dimensional and connected adjacent the lower margin thereof by transverse straps.

9. The structure as claimed in claim 8 in which said ribs are arcuate in cross section and said straps are flat, project between the lower edges of the arcuate ribs.

* * * * *